(12) United States Patent
Polepalli et al.

(10) Patent No.: US 10,237,301 B2
(45) Date of Patent: Mar. 19, 2019

(54) MANAGEMENT OF CELLULAR DATA USAGE DURING DENIAL OF SERVICE (DOS) ATTACKS

(71) Applicant: Fortinet, Inc., Sunnyvale, CA (US)

(72) Inventors: Shashidhar Reddy Polepalli, Cupertino, CA (US); Pankajkumar Chechani, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 160 days.

(21) Appl. No.: 15/184,749

(22) Filed: Jun. 16, 2016

(65) Prior Publication Data

US 2017/0366575 A1  Dec. 21, 2017

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *H04L 29/06* | (2006.01) | |
| *H04W 36/16* | (2009.01) | |
| *H04L 12/801* | (2013.01) | |

(52) U.S. Cl.
CPC ......... *H04L 63/1458* (2013.01); *H04L 47/11* (2013.01); *H04L 47/12* (2013.01); *H04L 63/1416* (2013.01); *H04W 36/165* (2013.01)

(58) Field of Classification Search
CPC ...... H04L 29/06; H04L 12/801; H04W 24/08; H04W 36/16
USPC .......................................................... 726/22
See application file for complete search history.

(56) References Cited

U.S. PATENT DOCUMENTS

| | | | | |
|---|---|---|---|---|
| 8,515,434 B1* | 8/2013 | Narendran | ............ | H04W 48/02 370/230 |
| 2005/0259645 A1* | 11/2005 | Chen | ................. | H04L 29/12066 370/389 |
| 2006/0185014 A1* | 8/2006 | Spatscheck | ......... | H04L 63/1458 726/23 |
| 2009/0293123 A1* | 11/2009 | Jackson | .............. | H04L 63/1458 726/23 |
| 2010/0162399 A1* | 6/2010 | Sheleheda | ........... | H04L 63/1416 726/24 |
| 2010/0229234 A1* | 9/2010 | Rouse | ................ | H04L 63/0218 726/11 |
| 2013/0263256 A1* | 10/2013 | Dickinson | ........... | H04L 63/1458 726/22 |
| 2013/0333029 A1* | 12/2013 | Chesla | .................... | H04L 45/74 726/22 |

(Continued)

OTHER PUBLICATIONS

Yuanyuan Zeng; Design of SMS Commanded-and-Controlled and P2P-Structured Mobile Botnets; ACM; 2012; p. 1-12.*

*Primary Examiner* — Monjur Rahim
(74) *Attorney, Agent, or Firm* — Hamilton, DeSanctis & Cha LLP

(57) ABSTRACT

Systems and methods for managing data usage of a cellular modem during DoS/DDoS attacks are provided. According to one embodiment, a network security device of a private network detects a DoS attack in network traffic going through the network security device and determines whether the DoS attack is being transmitted through a cellular modem of a cellular data network. The network security device reduces data usage of the cellular modem when the DoS attack is detected and the DoS attack being is transmitted through the cellular modem.

16 Claims, 6 Drawing Sheets

(56) References Cited

U.S. PATENT DOCUMENTS

| | | | | |
|---|---|---|---|---|
| 2014/0256366 A1* | 9/2014 | Gheri | ................... | H04W 4/14 |
| | | | | 455/466 |
| 2016/0352774 A1* | 12/2016 | Akcin | ................. | H04L 63/1441 |
| 2017/0237767 A1* | 8/2017 | George | .............. | H04L 63/1458 |
| | | | | 726/23 |

\* cited by examiner

MANAGEMENT OF CELLULAR DATA USAGE DURING DENIAL OF SERVICE (DOS) ATTACKS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to the field of cellular network technology. In particular, various embodiments relate to management of cellular data usage during Denial of Service (DoS) attacks.

Description of the Related Art

Nowadays, it is crucial for a company to maintain a reliable connection to the Internet without disruption. A private network of a company usually has more than one connection to the Internet so that a failover connection may maintain connectivity to the Internet when a primary Internet connection has failed.

FIG. 1 illustrates a typical prior art network architecture with wireless failover connections. As shown in FIG. 1, network security device 120 has a Local Area Network (LAN) port 124, which is used for connecting a local network. Network security device 120 also has a Wide Area Network (WAN) port 123, which is connected to a cable modem 122 which is usually provided by an Internet Service Provider (ISP). Cable modem 122 is used for connecting the local network to the Internet 150 through the ISP. Network security device 120 also has Third Generation (3G)/Fourth Generation (4G) modems 125 and 126 (and/or one or more Long Term Evolution (LTE) modems) as failover connections. 3G/4G modems 125 and 126 may be in the form of one or more Universal Serial Bus (USB) dongles that are inserted into a USB port of Network security device 120. When the primary Internet connection is lost as a result of a problem with cable modem 122 or the ISP, 3G/4G modem 125 or 126 may connect to the Internet 150 through a 3G/4G cellular network. To improve the 3G/4G connection, remote wireless adapters have been introduced so that a 3G/4G USB wireless modem may be connected to the network security device remotely. As shown in FIG. 1, remote wireless adapter 110 has 3G/4G modems 112 and 113 and an Ethernet port 111. Remote wireless adapter 110 may be placed at a remote place from network security device 120 where the 3G/4G signal is stronger than the 3G/4G signal observed at the location of network security device 120. Network security device 120 and remote wireless adapter 110 are connected through a cable between WAN port 121 of network security device 120 and Ethernet port 111 of remote wireless adapter 110. Remote wireless adapter 110 is another router besides cable modem 122. Public Internet Protocol (IP) addresses assigned to 3G/4G modems 112 and 113 by 3G/4G cellular network are sent to network security device 120. When the primary Internet connection of cable modem 122 is down, network security device 120 forwards all outgoing traffic to WAN port 121. The outgoing traffic is then forwarded to the Internet through 3G/4G modems 112 and 113 of remote wireless adapter 110.

Network security device 120, e.g., a firewall, is used for protecting the networks from attacks, e.g., malware, virus, Distributed DoS (DDoS) and the like. An administrator may deploy a network security appliance, e.g., network security device 120, at a border of a private network and configure a set of security policies in accordance with the needs of the private network. Network security device 120 then checks network traffic going through the private network based on the security policies. An action, e.g., allow, deny or deep scanning, may be taken to on network traffic when the traffic triggers a security policy. Network security device 120 may also detect DoS attacks by observing and tracking network traffic arriving at the private network. When one or more attributes of the network traffic exceed predetermined parameters, the DoS network traffic is blocked and normal network traffic is allowed to go through network security device 120.

When the private network is connected to the Internet through 3G/4G modems 112, 113, 125 or 126, network traffic is transmitted/received through cellular data networks. Typically, any data traffic transmitted via the cellular modems is counted towards a data plan usage of a carrier of a cellular network. During DoS attacks, a large amount of network traffic, due to the DoS attack, is received by the cellular modems. It may result in one or more of the following consequences:

i) Quick and unexpected overage of the subscribed Internet data plan.
ii) Inactive Internet connection once the subscribed limit of the Internet data plan is reached.
iii) Slow internet connectivity once the subscribed limit of high speed Internet data plan is reached as some carriers throttle the speeds to lower levels after reaching a certain limit.
iv) Footing an expensive bill for Internet data usage.
v) Poor Internet connectivity affecting the services received/offered, which rely primarily on the underlying cellular Internet.

Therefore, there is a need for an effective management of cellular network data usage when an enterprise network is experiencing a DoS attack.

SUMMARY

Systems and methods for managing data usage of a cellular modem during DoS/DDoS attacks are provided. According to one embodiment, a network security device of a private network detects a denial of service (DoS) attack in network traffic going through the network security device and determines whether the DoS attack is being transmitted through a cellular modem of a cellular data network. The network security device reduces data usage of the cellular modem when the DoS attack is detected and the DoS attack is being transmitted through the cellular modem.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
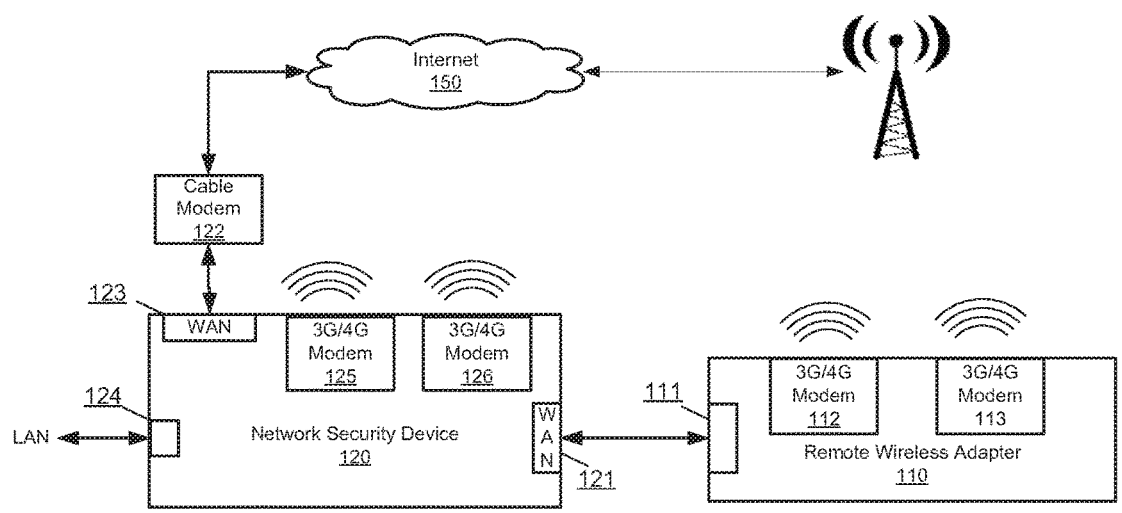
FIG. 1 illustrates a typical prior art network architecture with cellular data network connections.

Systems and methods for managing data usage of a cellular modem during DoS/DDoS attacks are provided. According to one embodiment, a network security device of a private network detects a denial of service (DoS) attack in network traffic going through the network security device and determines whether the DoS attack is being transmitted through a cellular modem of a cellular data network. The network security device reduces data usage of the cellular modem when the DoS attack is detected and the DoS attack is being transmitted through the cellular modem.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The term "connection" generally refers to a TCP connection that is in-process, pending or active during any phase/stage, including, but not limited to during the 3-way handshake that establishes a TCP connection, during data transfer and/or prior to the conclusion of the formal 4-way TCP connection termination process.

If the specification states a component or feature "may", "can", "could", or "might" be included or have a characteristic, that particular component or feature is not required to be included or have the characteristic.

Figure 2:
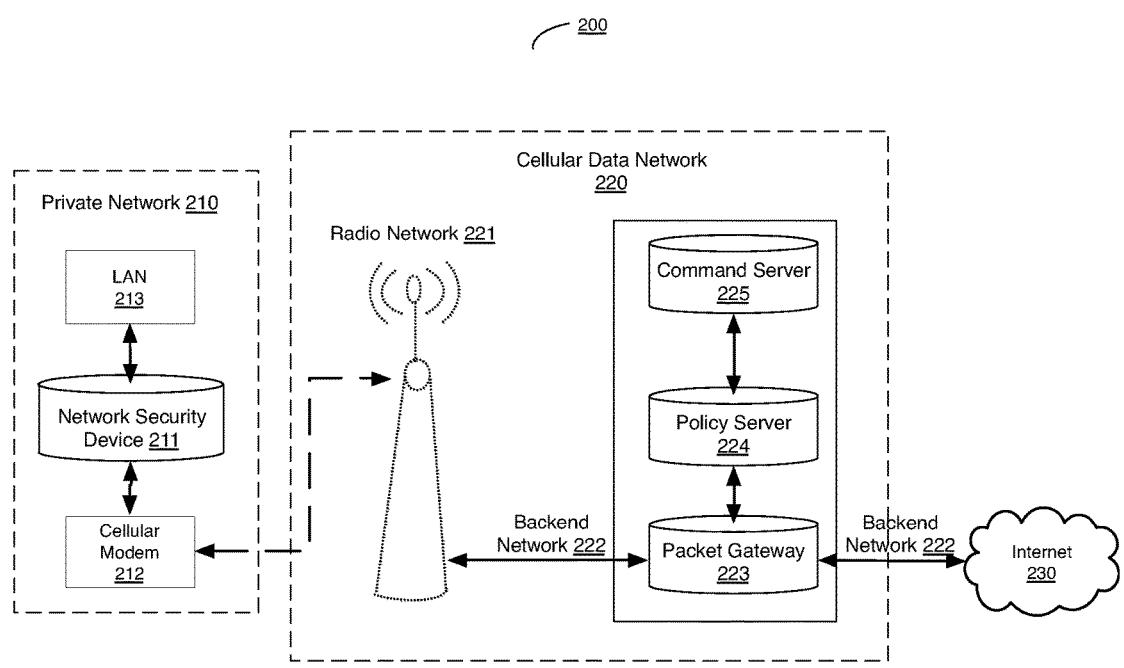
FIG. 2 illustrates an exemplary network architecture with cellular data network connections that are managed in accordance with an embodiment of the present invention.

FIG. 2 illustrates an exemplary network architecture 200 with cellular data network connections that are managed in accordance with an embodiment of the present invention. Network architecture 200 includes a private network 210, which is connected to the Internet 230 through a cellular data network 220. Private network 210 may include multiple network appliances (not shown), including, but not limited to local servers, local Personal Computers (PCs), local laptops, mobile devices, network security devices and other computing devices that are operatively coupled to each other through a Local Area Network (LAN) 213, wherein LAN 213 is then operatively coupled with network security device 211 which enable the access to Internet 230.

Network security device 212 separates the external computing environment, represented by cellular data network 220 and Internet 230, from the internal computing environment of private network 210. Network security device 211 may intercept communications between Internet 130 and the network appliances of private network 210 and may, among other things, scan for malware, viruses or high risk network accesses. Network security device 211 may usually be connected to Internet 230 through one or more cable modems (not shown) which may provide high speed access to the Internet 230. In embodiments of the present invention, network security device 211 may connect to a cellular modem 212 as a failover connection to Internet 230. Cellular modem 212 may be 3G/4G modems 125, 126, 112 and 113 of FIG. 1. When the primary Internet connection of a cable modem is down, network security device 211 routes all network traffic to cellular modem 212 to maintain a reliable connection to the Internet without any disruption. Although cellular modem 212 is usually employed as a failover connection, in alternative embodiments, cellular modem 212 may represent a primary or the only Internet connection of private network 210. Generally, the transmission speed of cellular modem 212 is configurable through a set of commands that is defined by the manufacturer of cellular modem 212. In one example, cellular modem 212 is configured by network security device 211 to reduce the transmission speed when private network 210 is experiencing a DoS attack. By lowering the transmission speed of cellular modem 212, the overall data usage of cellular modem 212 may be reduced to prevent cellular modem 212 from consuming an associated cellular data plan with a wireless communication service provider or carrier too quickly when network traffic associated with a DoS attack is being transmitted through cellular modem 212. This example will be described in further detail below with reference to FIG. 3.

Cellular data network 220 is a wireless network that may be operated by a wireless communication service provider. Cellular data network 220 may comprise a large number of wireless infrastructures represented by radio network 221. Each of the wireless infrastructures may cover a certain area and provide voice, text messaging and data connection services for its subscribers' wireless devices, including, but not limited to mobile phones and cellular modem 212, within its coverage. Radio network 221 connects the Internet 230 through a backend network 222 of the wireless communication service provider. Data packets that are transmitted by backend network 222 between user devices and the Internet 230 may be routed by a packet gateway 223. Packet gateway 223 may control the network traffic between user devices and the Internet 230 based on policies hosted by a policy server 224. A user device, e.g., cellular modem 212, is typically associated with a data plan, which may allow, for example, only 10 GBs of data to be transmitted to/from cellular modem 212 within a month for a monthly fee. This data limit policy is hosted by policy server 224. Policy server 224 may check the data usage of cellular modem 212. Network traffic through cellular modem 212 is allowed by packet gateway 223 if the data usage is under the data limit. Policy server 224 may also host other policies for cellular modem 212 based on the associated data plan. For example, the data plan of cellular modem 212 may further comprise optional policies when data transmission is out of the data plan. The optional policies may include, but not limited to:
1. An extra fee being charged when data usage is over the data plan.
2. Stopping data transmission when data usage is over the data plan or over a maximum data limit. Usually, text messaging service is still provided by the wireless carrier even when the data transmission service is stopped for a wireless user.
3. Transmission speed over the cellular data network being reduced when data usage is over the data plan. For example, the wireless carrier may reduce the data transmission speed to 100 KB/S over a 4G/LTE connection after the data usage of a user is over its limit. The wireless carrier may also stop 4G/LTE service but keep 3G or other lower bandwidth services after the data usage of a user is over its limit. In this context, reducing the transmission speed of the cellular data network is used to protect the wireless users from extra fees associated with data transmissions exceeding the data limit.

Policy server 224 may also have network security policies that control network traffic transmitted to users' wireless devices. For example, policy server 224 may allow/block certain network traffic according to a 5-tuple (e.g., source IP, destination IP, source port, destination port, protocol) of the network traffic. In another example, policy server 224 may allow/block transmission of certain content/applications/ network traffic that may be recognized based on signatures or other information within the network traffic. The carrier of cellular data network 220 may provide an interface for users to configure their own network policies to control their network traffic. In one example, network security device 211 may control the network traffic that is to be transmitted to cellular modem 212 during DoS attacks through policy server 224. Network security device 211 may transfer information/signatures associated with the DoS traffic to policy server 224. Policy server 224 may configure corresponding DoS mitigation policies to block the designated DoS network traffic from being transmitted to cellular modem 212. As the network traffic associated with DoS attacks is blocked at the cellular data network side, only legitimate network traffic may go through cellular data network and be transmitted to cellular modem 212, thereby reducing various affects of DoS attacks. As the data transmission incurred by DoS attacks are blocked at cellular data network 220 end without transmission to cellular modem 212, significantly less data usage of cellular modem 212 is wasted by the DoS attacks as described in further detail below with reference to FIGS. 4 and 5.

In the context of the present example, a command server 225 is used for receiving traffic control commands from network security device 211 and configuring DoS mitigation policies on policy server 224. Usually, cellular data network 220 has a large number of packet gateways and policy servers deployed at different locations. These packet gateways and policy servers may be from different manufacturers and may have different commands/network policy rules for controlling network traffic going through the packet gateways. It may be hard for network security device 211 as a cellular network user to know different commands/network policy rules of cellular data network 220 and directly control policy server 224. Command server 225 may be used for providing a universal interface for cellular network users and accepting traffic control commands and/or DoS attack signatures on the fly. The traffic control commands and/or DoS signatures may be decoded and corresponding DoS mitigation policies may be configured at the policy server by command server 225. Further, command server may be used for authenticating users of cellular data network 220 before accepting traffic control commands from network security device 211. The operations of command server 225 are described below in further detail with reference to FIGS. 4 and 5.

Figure 3:
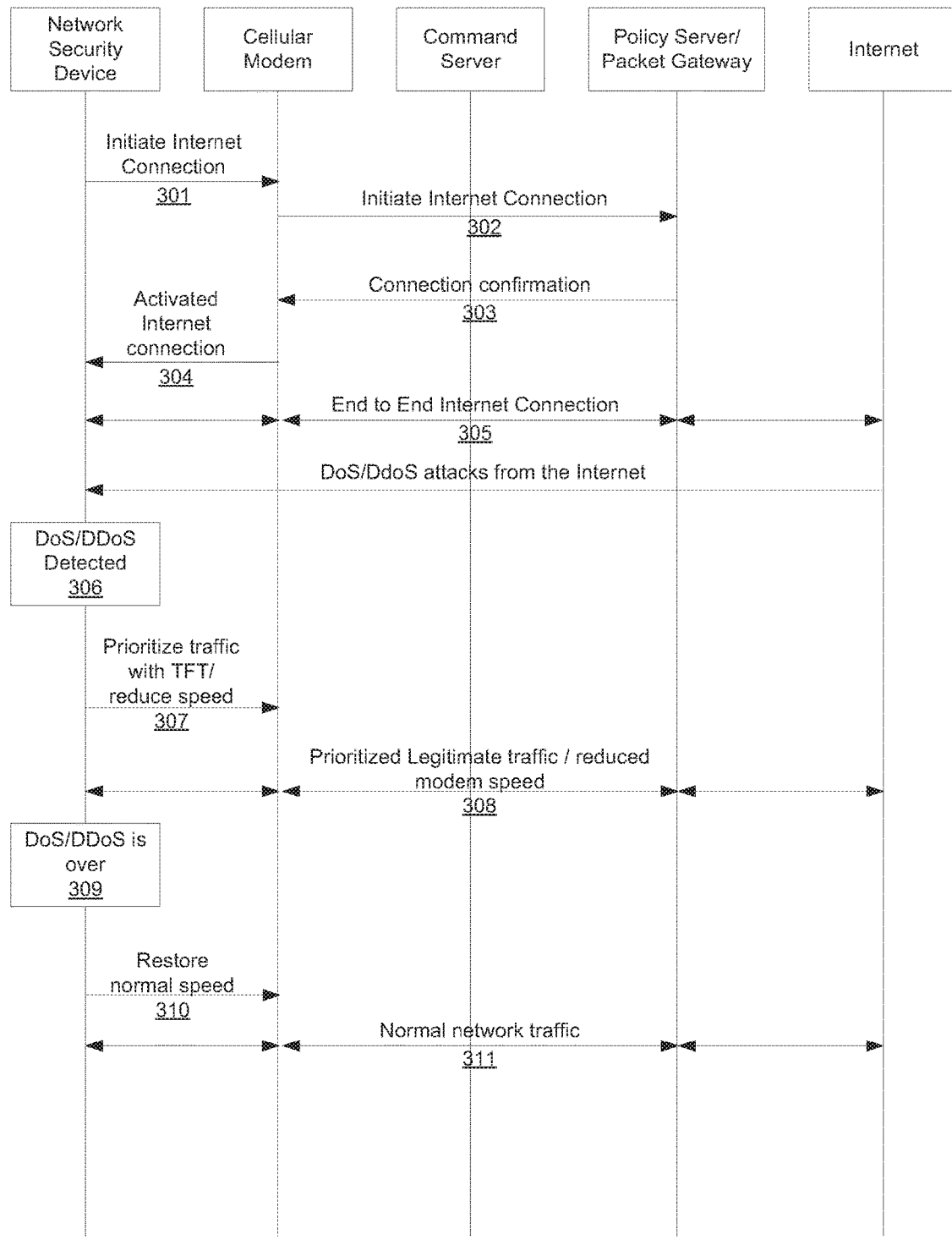
FIG. 3 is a sequence chart illustrating the interactions between a network security device and a cellular data network in accordance with a first embodiment of the present invention.

FIG. 3 is a sequence chart illustrating the interactions between a network security device and a cellular data network in accordance with a first embodiment of the present invention. In the present example, a network security device may reduce the transmission speed of a cellular modem during DoS/DDoS attacks to reduce wasted data usage incurred as a result of the DoS/DDoS attacks and/or may prioritize the legitimate traffic.

At step 301, a network security device initiates an Internet connection request to a cellular modem that is operationally connected to the network security device. Usually, the network security device has a primary Internet connection through one or more cable modems that provide high speed access. The cellular modem is typically deployed as a failover connection for a private network. When the primary Internet connection is lost, the network security device may send a command to the cellular modem to start an Internet connection through a cellular data network with which the cellular modem is associated.

At step 302, the cellular modem initiates an Internet connection request through a cellular base station associated with the cellular data network, such as a wireless wide area network (WWAN), e.g., a 3G or 4G/LTE network.

At step 303, the cellular data network may confirm the request and establish a connection with the cellular modem.

At step 304, the cellular modem confirms that an Internet connection is established to the network security device.

At step 305, the network security device routes network traffic to the cellular modem in order that the private network may keep accesses to the Internet through the cellular data network.

The processes of connecting a private network to a cellular data network through cellular modem is well-known to those skilled in the art and hence further description thereof will be omitted for brevity.

At step 306, DoS/DDoS attacks are detected by the network security device. For example, the network security device may monitor the network traffic going through cellular modem and determine if one or more predefined or dynamically calculated adaptive network traffic characteristic thresholds are exceeded. When the thresholds are exceeded, the network security device may determine that DoS/DDoS attacks are being carried out via the network traffic going through the cellular modem. DoS/DDoS detection is well-known to those skilled in the art and hence further description thereof will be omitted for brevity. When a DoS attack is identified as coming though the cellular modem, the process goes to step 307.

At step 307, the network security device may prioritize traffic with traffic flow templates (TFTs) and/or temporally reduce the transmission speed of the cellular modem to prevent waste of data usage incurred by the attack(s). The network security device may set TFTs of the cellular modem to control the speed of operation and prioritize legitimate traffic. For example, the network security device may send an AT command (e.g., an "AT+CGTFT" command) to the cellular modem. This command may allow the cellular modem to specify a Packet Filter for a TFT that is used in the Gateway GPRS Support Node (GGSN) for routing of downlink packets onto different Quality of Service (QoS) flows towards the cellular modem. AT commands are described in the 3GPP TS 23.060. A TFT consists of from one to up to eight Packet Filters, each of which is uniquely identifiable. A Packet Filter is unique within all TFTs associated with all packet data protocol (PDP) contexts that are associated with the same PDP address. The set command specifies a Packet Filter that is to be added to the TFT stored in the cellular modem and used for the context identified by the (local) context identification parameter. The specified TFT will be stored in the GGSN only at activation or mobile station (MS)-initiated modification of the related context. Since this is the same parameter that is used in the AT+CGD-CONT and AT+CGDSCONT commands, the +CGTFT command is effectively an extension to these commands. The Packet Filters consist of a number of parameters, each of which may be set to a separate value. A special form of the set command, +CGTFT=causes all of the Packet Filters in the TFT for context number to become undefined. At any time there may exist only one PDP context with no associated TFT amongst all PDP contexts associated to one PDP address.

At step 308, the speed of the cellular modem is reduced and legitimate traffic is prioritized as instructed by the network security device.

At step 309, the network security device detects no DoS/DDoS attacks.

At step 310, the network security device restores the cellular modem to its normal speed. For example, network security device may clear the TFT settings and restore normal speed of the cellular modem.

At step 311, the network transmission between the cellular modem and the cellular data network goes back to normal speed.

Figure 4:
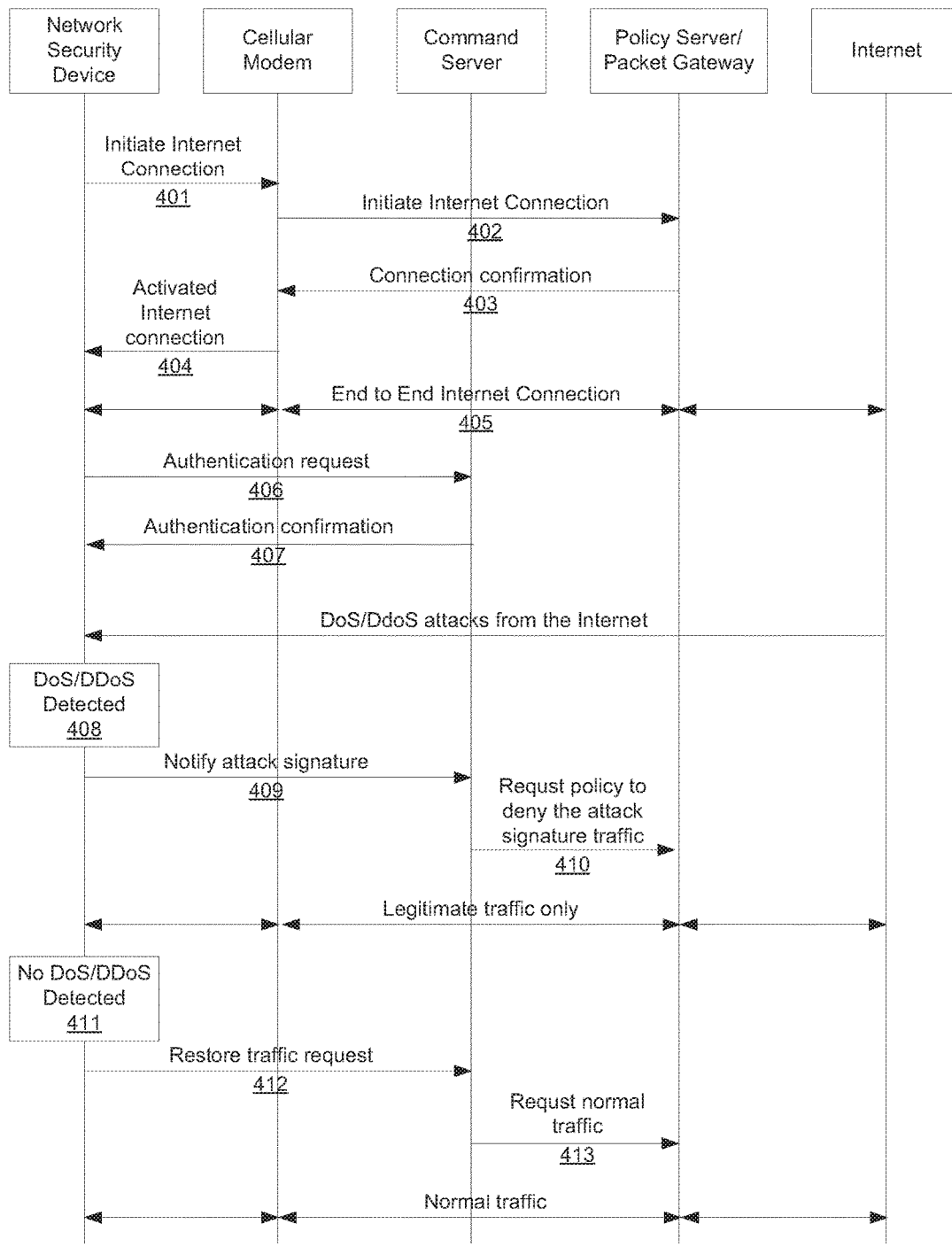
FIG. 4 is a sequence chart illustrating the interactions between a network security device and a cellular data network in accordance with a second embodiment of the present invention.

FIG. 4 is a sequence chart illustrating the interactions between a network security device and a cellular data network in accordance with a second embodiment of the present invention. In the above example, the overall transmission speed of a cellular modem is reduced during DoS/DDoS attacks to reduce wasted data usage. However, while the data usage waste incurred by the DoS/DDoS attacks are reduced, the transmission speed of legitimate network traffic is also reduced during the attacks. In embodiments of the present invention, a network security device sends transmission control commands to a cellular data network in order to reduce data usage waste of the cellular modem by filtering out network traffic associated with DoS/DDoS attacks at the cellular data network end and by attempting to retain normal transmission of legitimate network traffic.

At steps 401-405, an Internet connection is established for a private network through a cellular data network. This process is essentially the same as steps 301-305 discussed above with reference to FIG. 3.

At step 406, the network security device may optionally send an authentication request to a command server of the cellular data network. The network security device may be registered with the command server and a user's account is created for the network security device at the command server. Therefore, the network security device may request to authenticate itself with the command server to keep operations of the command server safe.

At step 407, the command server of the cellular data network may authenticate the network security device based on the user credentials collected from the authentication request. If the network security device is a legitimate user, the command server may subsequently accept requests from the network security device.

At step 408, DoS/DDoS attacks are detected by the network security device within network traffic going through cellular modem. When DoS/DDoS attacks are detected, the network security device may extract information from the network traffic indicative of the DoS/DDoS attacks, such as a 5-tuple or other signatures/patterns of the network traffic. The DoS/DDoS detection and extracting signatures/patterns of DoS/DDoS attacks are well-known to those skilled in the art and hence further description thereof will be omitted for brevity.

At step 409, the network security device sends out a DoS attack mitigation request including the information regarding the DoS/DDoS attacks to the command server of the cellular data network.

At step 410, the command server may decode the signatures of DoS/DDoS attacks and create network policies that may filter out the corresponding network traffic associated with the DoS/DDoS attacks at a policy server of the cellular data network. The command server may create DoS/DDoS mitigation policies based on the syntax of the policy server and configure the network policies on the policy server through an interface provided by the policy server. For example, the command server may extract 5-tuples of the network traffic associated with the DoS/DDoS attacks from the signatures received from the network security device. The command server may create DoS/DDoS attack mitigation policies that block network traffic that matches the 5-tuples through an application program interface (API)/command line interface (CLI) of the policy server. After the policies are created at the policy server, the network traffic associated with the DoS/DDoS attacks are blocked by the packet gateways and legitimate network traffic is transmitted normally to the cellular modem. DoS/DDoS attack mitigations by policy servers or packet gateways are well-known to those skilled in the art and hence further description thereof is omitted. In this manner, data usage waste (e.g., the network traffic associated with DoS/DDoS attacks) is avoided because the network traffic corresponding to the DoS/DDoS attacks is not transmitted to the cellular modem.

At step 411, the network security device detects no DoS/DDoS attacks.

At step 412, the network security device may send a restore traffic request to the command server.

At step 413, the command server may change/delete/disable the DoS attack mitigation policies at the policy server. The network traffic transmission from packet gateways to the cellular modem is restored back to normal state.

Alternatively, when the network security device sends the request to the command server to create DoS/DDoS attack mitigation policies, the network security device may designate a time period that the DoS/DDoS attack mitigation policies are effective. After the designated time period, the network traffic going to the cellular modem goes back to normal automatically.

In some cases, DoS/DDoS attacks are occurring but blocked at the cellular data network as requested by the network security device, the network security device cannot detect the DoS/DDoS attacks. If the network traffic goes back to normal and DoS/DDoS attacks are detected again by the network security device. Then, the effective time period of the DoS/DDoS attack mitigation policies may be extended to a longer time in order that the DoS/DDoS may be effectively blocked by the cellular data network.

Figure 5:
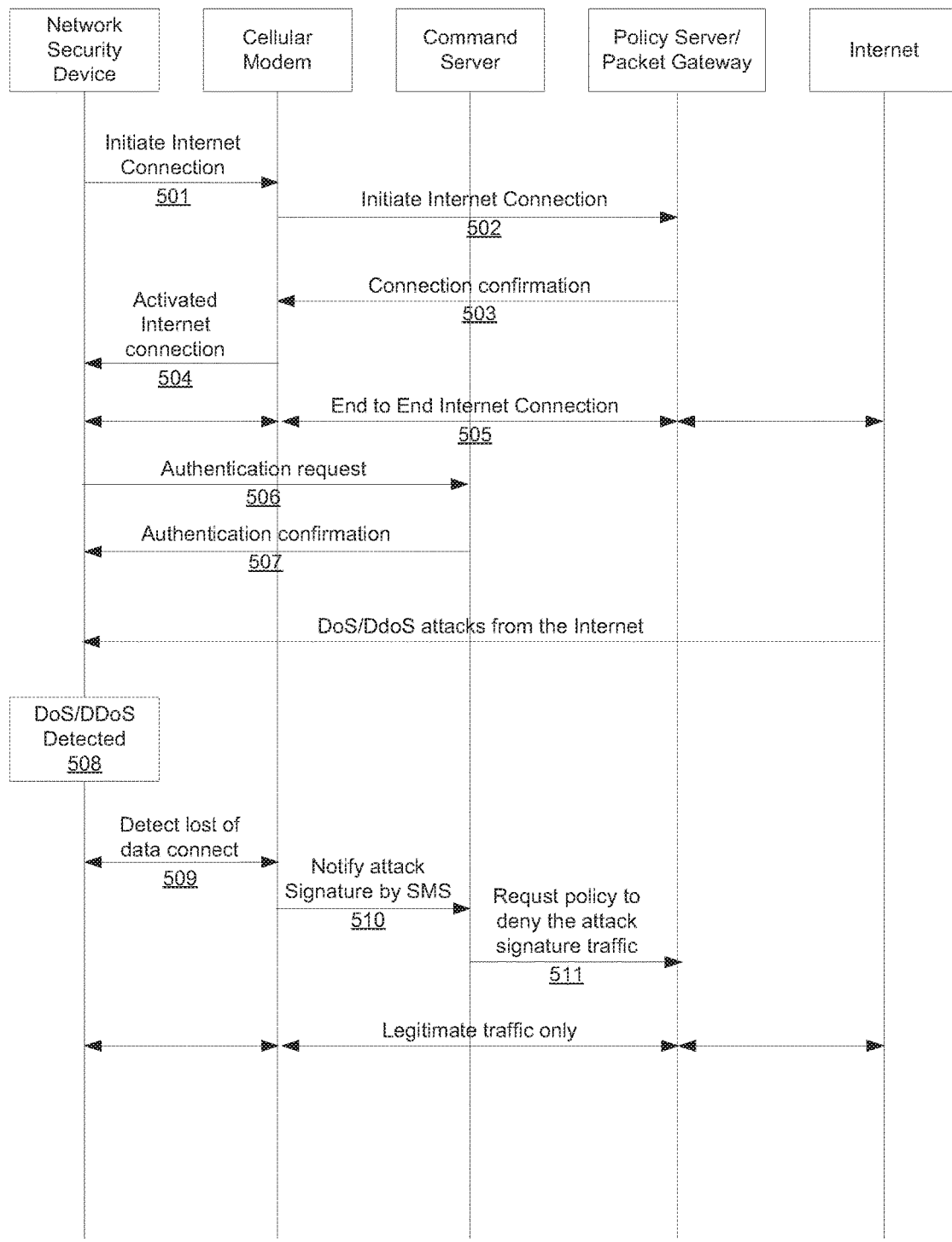
FIG. 5 is a sequence chart illustrating the interactions between a network security device and a cellular data network in accordance with a third embodiment of the present invention.

FIG. 5 is a sequence chart illustrating the interactions between a network security device and a cellular data network in accordance with a third embodiment of the present invention. In this example, DoS attack mitigation requests are sent by a network security device through SMS message in case the network security device loses all its network connection with a command server of a cellular data network.

In this example, steps 501-508 are essentially the same as step 401-408 as described with reference to FIG. 4. After DoS/DDoS attacks are detected, the network security device may further check if a network connection to the cellular data network has been lost at step 509. For example, the cellular modem may run out of data usage due to a large amount of network traffic being used by the attacks and the network connection being blocked by the policy server of cellular data network. Therefore, no network connection may exist between the network security device and the command server of the cellular network.

At step 510, the network security device may send the DoS attack mitigation request including the signatures of DoS/DDoS attacks by the cellular modem through SMS messages. Usually, the cellular modem has a usage plan that includes a limited data usage for 3G/4G/LTE data transmission and a limited or unlimited text messaging service. When the data usage of the cellular modem runs out, the text messaging service may still be available and the network security device may send out a mitigation request through text messages.

At step 511, the command server receives the DoS attack mitigation request through SMS messages and then configures the policy server and mitigates the DoS attacks as described above at steps 410-413 of FIG. 4.

Figure 6:
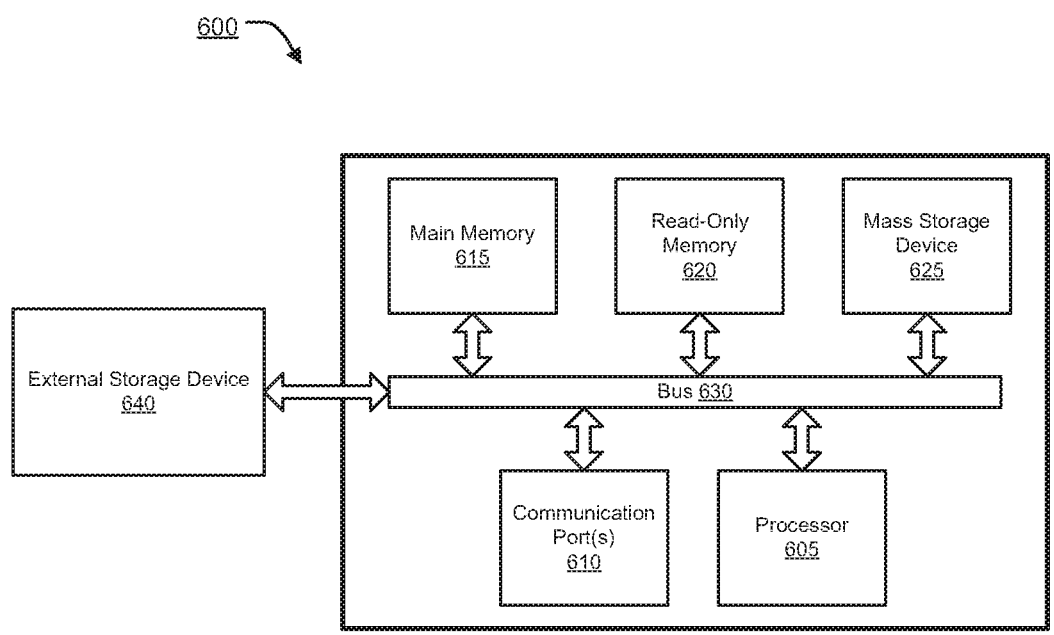
FIG. 6 illustrates an exemplary computer system in which or with which embodiments of the present invention may be utilized.

FIG. 6 is an example of a computer system 600 with which embodiments of the present disclosure may be utilized. Computer system 600 may represent or form a part of a network security device (e.g., network security device 211), a network appliance, a server or a client workstation.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   detecting, by a network security device of a private network, a denial of service (DoS) attack in network traffic observed by the network security device;
   determining, by the network security device, whether the DoS attack is being transmitted through a cellular modem associated with a cellular data network; and
   responsive to said determining being affirmative, mitigating adverse affects of the DoS attack, including, managing cellular network data usage while the private network is experiencing the DoS attack by reducing, by the network security device, data usage of the cellular modem by: setting, by the network security device, a traffic flow template (TFT) on the cellular modem by sending, by the network security device, a control command to the cellular modem to reduce its usage of the cellular data network, wherein the TFT is used for routing of downlink packets onto different quality of service (QoS) flows towards the cellular modem or sending, by the network security device, a control command to a command server of the cellular data network to reduce data usage of the cellular data network, including: encoding, by the network security device, information regarding the DoS attack within the control command to the command server; and sending, by the network security device, the information regarding the DoS attack to the command server of the cellular data network, wherein the information regarding the DoS attack is decoded by the command server and network traffic deemed to be associated with the DoS attack based on the information regarding the DoS attack is blocked or at least reduced by the cellular data network.

2. The method of claim 1, further comprising authenticating, by the network security device, with the command server of the cellular data network before sending the control command to the command server.

3. The method of claim 1, wherein the control command is sent by the cellular modem through a short message service (SMS) message to the command server of the cellular data network.

4. The method of claim 3, further comprising: detecting, by the network security device, whether the private network has lost its network connection with the cellular data network; and when a result of said detecting is affirmative, then sending the control command through the SMS message.

5. The method of claim 1, further comprising restoring, by the network security device, the data usage of the cellular modem when the DoS attack is determined to be over.

6. A network security device comprising:
   a non-transitory storage device having embodied therein instructions representing a security application; and
   one or more processors coupled to the non-transitory storage device and operable to execute the security application to perform a method comprising:
   detecting a denial of service (DoS) attack in network traffic of a private network protected by the network security device;
   determining whether the DoS attack is being transmitted through a cellular modem associated with a cellular data network used by the private network; and
   responsive to said determining being affirmative, mitigating adverse affects of the DoS attack, including, managing cellular network data usage while the private network is experiencing the DoS attack by reducing data usage of the cellular modem by:
   setting, by the network security device, a traffic flow template (TFT) on the cellular modem by sending, by the network security device, a control command to the cellular modem to reduce its usage of the cellular data network, wherein the TFT is used for routing of downlink packets onto different Quality of service (QoS) flows towards the cellular modem; or sending, by the network security device, a control command to a command server of the cellular data network to reduce data usage of the cellular data network, including: encoding, by the network security device, information regarding the DoS attack within the control command to the command server; and sending, by the network security device, the information regarding the DoS attack to the command server of the cellular data network, wherein the information regarding the DoS attack is decoded by the command server and network traffic deemed to be associated with the DoS attack based on the information regarding the DoS attack is blocked or at least reduced by the cellular data network.

7. The network security device of claim 6, wherein the method further comprises authenticating with the command server of the cellular data network before sending the control command to the command server.

8. The network security device of claim 6, wherein the control command is sent by the cellular modem through a short message service (SMS) message to the command server of the cellular data network.

9. The network security device of claim 8, wherein the method further comprises: detecting whether the private network has lost its network connection with the cellular data network; and when a result of said detecting is affirmative, then sending the control command through the SMS message.

10. The network security device of claim 6, wherein the method further comprises restoring the data usage of the cellular modem when the DoS attack is determined to be over.

11. The method of claim 1, wherein the control command to the cellular modem comprises an AT command.

12. The method of claim 11, wherein the AT command comprises AT+CGTFT.

13. The method of claim 1, wherein the information regarding the DoS attack comprises an attack signature of the DoS attack.

14. The network security device of claim 6, wherein the control command to the cellular modem comprises an AT command.

15. The network security device of claim 14, wherein the AT command comprises AT+CGTFT.

16. The network security device of claim 6, wherein the information regarding the DoS attack comprises an attack signature of the DoS attack.

* * * * *